(12) United States Patent
Nonomura et al.

(10) Patent No.: US 6,926,793 B2
(45) Date of Patent: Aug. 9, 2005

(54) METHOD AND APPARATUS FOR FABRICATING A MULTI-FIBER POLARIZATION-MAINTAINING FIBER ASSEMBLY

(75) Inventors: Masanori Nonomura, Nagano (JP); Hidetoku Iida, Nagano (JP); Atsushi Koyama, Nagano (JP)

(73) Assignee: Totoku Electric Co., Ltd., Tokyo (JP)

( * ) Notice: Subject to any disclaimer, the term of this patent is extended or adjusted under 35 U.S.C. 154(b) by 433 days.

(21) Appl. No.: 09/942,857

(22) Filed: Aug. 30, 2001

(65) Prior Publication Data

US 2002/0129623 A1 Sep. 19, 2002

(30) Foreign Application Priority Data

Mar. 14, 2001 (JP) ........................................ 2001-071583

(51) Int. Cl.[7] .............................. B32B 31/00; G02B 6/36
(52) U.S. Cl. ................. 156/293; 156/294.1; 156/303.1; 385/53; 385/60; 385/70; 385/76; 385/78; 385/80

(58) Field of Search .............................. 385/53, 59, 60, 385/70, 72, 76, 78, 80, DIG. 8; 156/293, 294.1, 303.1

(56) References Cited

U.S. PATENT DOCUMENTS

| 5,403,977 | A | * | 4/1995 | Steptoe et al. ............ 174/77 R |
| 5,422,971 | A | * | 6/1995 | Honjo et al. .................. 385/80 |
| 5,625,735 | A | * | 4/1997 | Di Maggio et al. ........... 385/91 |
| 6,007,257 | A | * | 12/1999 | Ogawa et al. ................ 385/80 |
| 6,062,740 | A | * | 5/2000 | Ohtsuka et al. ............... 385/81 |
| 6,134,360 | A | * | 10/2000 | Cheng et al. ................. 385/39 |
| 6,231,244 | B1 | * | 5/2001 | Fukuyama et al. ........... 385/76 |

FOREIGN PATENT DOCUMENTS

JP           01232308    *   9/1989

* cited by examiner

Primary Examiner—Jeff H. Aftergut
Assistant Examiner—Justin R. Fischer
(74) Attorney, Agent, or Firm—Jordan and Hamburg LLP (57) ABSTRACT

While clamped by a clamping jig 100, polarization-maintaining fiber cables 11 and 12 are automatically oriented with an orientation adjusting unit 200 and then heated by a heater 105 for curing thermoset resins.

2 Claims, 13 Drawing Sheets

METHOD AND APPARATUS FOR FABRICATING A MULTI-FIBER POLARIZATION-MAINTAINING FIBER ASSEMBLY

FIELD OF THE INVENTION

The present invention relates to a method and an apparatus for fabricating a multi-fiber polarization-maintaining fiber assembly and particularly, to a method and an apparatus for easily fabricating a multi-fiber polarization-maintaining fiber assembly which has a plurality of polarization-maintaining fiber cables assembled integrally by a multi-fiber ferrule.

BACKGROUND OF THE INVENTION

A two-fiber polarization-maintaining fiber assembly having two polarization-maintaining optical fiber cables assembled integrally by a two-fiber ferrule is fabricated in a conventional manner which comprises the steps of:

(1) removing covers a few centimeters from the leading end of each of the two polarization-maintaining fiber cables;

(2) filling a thermoset resin in an inner space of the two-fiber ferrule;

(3) inserting the two polarization-maintaining fiber cables into the inner space of the two-fiber ferrule and inserting their exposed fiber portions into corresponding fiber holes of the two-fiber ferrule;

(4) clamping the two-fiber ferrule so as not to be rotated and axially rotating each of the polarization-maintaining fiber cables to determine the orientation of the polarization-maintaining fiber cables;

(5) heating up the two-fiber ferrule to cure the thermoset resin.

However, the conventional method for fabricating a two-fiber polarization-maintaining fiber assembly has the following disadvantages.

(1) The step of inserting the exposed fiber portions of the polarization-maintaining fiber cables into the corresponding fiber holes of the two-fiber ferrule is troublesome.

(2) The step of adjusting the orientation of each of the polarization-maintaining fiber cables is troublesome.

(3) The step of curing the thermoset resin is troublesome.

SUMMARY OF THE INVENTION

It is thus an object of the present invention to provide a method and an apparatus for fabricating with much ease a multi-fiber polarization-maintaining fiber assembly which has a plurality of polarization-maintaining fiber cables assembled integrally by a multi-fiber ferrule.

As a first feature of the present invention, a method of fabricating a multi-fiber polarization-maintaining fiber assembly is provided comprising: (1) a cover removal step for removing covers a few centimeters at one end from a plurality of polarization-maintaining fiber cables with difference of a few millimeters; (2) an assembly step for inserting the polarization-maintaining fiber cables into corresponding insertion holes of a holder tube, holding them integrally with their exposed fiber portions arranged abreast at proximal end, and sealing the leading end of the insertion holes of the holder tube with a thermoset resin which is relatively high in the viscosity; (3) an adhesive filling step for filling an inner space of a multi-fiber ferrule with a thermoset resin which is relatively low in the viscosity; (4) a fiber cable insertion step for inserting the polarization-maintaining fiber cables assembled integral with the holder tube into the inner space of the multi-fiber ferrule, and inserting thier exposed fiber portions into corresponding fiber holes of the multi-fiber ferrule; (5) an orientation adjustment step for, while clamping the multi-fiber ferrule with a clamping jig not to be rotated, rotating each of the polarization-maintaining fiber cables to determine its orientation; and (6) an adhesive curing step for heating up the multi-fiber ferrule remaining clamped by the clamping jig to cure the thermoset resins.

The method of fabricating a multi-fiber polarization-maintaining fiber assembly of the first feature of the present invention has following advantages.

(1) The holder tube holds the polarization-maintaining fiber cables, thus the process for inserting the polarization-maintaining fiber cables into the inner space of the multi-fiber ferrule is eased.

(2) As the covers are removed a few centimeters at one end from the polarization-maintaining fiber cables with difference of a few millimeters and the holder tube holds the polarization-maintaining fiber cables integrally with their exposed fiber portions arranged abreast at proximal end, a difference of a few millimeters is occurred at a leading ends of the polarization-maintaining fiber cables held integrally by the holder tube. By this difference of the leading ends, the process for inserting the exposed fiber portions of the polarization-maintaining fiber cables into the corresponding fiber holes of the multi-fiber ferrule is eased.

(3) The thermoset resin which is relatively low in the viscosity is filled in the inner space of the multi-fiber ferrule, thus the thermoset resin hardly disturbs the insertion of the exposed fiber portions of the polarization-maintaining fiber cables into the corresponding fiber holes.

(4) The leading end of the insertion holes of the holder tube is sealed with the thermoset resin which is relatively high in the viscosity, thus the thermoset resin which is relatively low in the viscosity is inhibited from being absorbed into the insertion hole of the holder tube.

(5) The clamping jig is used for adjusting the orientation of each polarization-maintaining filer cable, thus contributing to the ease of the operation.

(6) The thermoset resin is heated in condition with the multi-fiber ferrule secured by the clamping jig, thus easing the operation.

As a second feature of the present invention, an apparatus for fabricating a multi-fiber polarization-maintaining fiber assembly is provided comprising a clamping jig and an orientation adjusting unit, the clamping jig including a ferrule clamping means for clamping a multi-fiber ferrule so as not to be rotated and a fiber cable clamping means for clamping polarization-maintaining fiber cables so as to be rotated, the orientation adjusting unit including an imaging means for imaging a leading end of the polarization-maintaining fiber cables clamped by the clamping jig, an image processing means for identifying each orientation of the polarization-maintaining fiber cables based on the images of the leading end of the polarization-maintaining fiber cables, and an orientation adjustment controlling means for controllably driving the fiber cable clamping means to axially rotate each of the polarization-maintaining fiber cables for automatically adjusting the orientation of the polarization-maintaining fiber cables.

Using the apparatus for fabricating a multi-fiber polarization-maintaining fiber assembly of the second feature of the present invention, the method of fabricating a multi-fiber polarization-maintaining fiber assembly of the first feature of the present invention can favorably be implemented. In particular, the orientation of each polarization-maintaining fiber cable is automatically adjusted and a duration required for its action can significantly be shorter than that of the manual operation by an operator.

As a third feature of the present invention, the apparatus for fabricating a multi-fiber polarization-maintaining fiber assembly is provided in which the orientation adjustment controlling means is arranged to axially rotate the polarization-maintaining fiber cables and when a stabilization time has been passed, check the orientation.

A length of the stabilization time may preferably be 3 to 30 seconds.

There are adverse factors including the viscosity of the thermoset resin and the twist and return of the polarization-maintaining fiber cables. When the polarization-maintaining fiber cable is rotated and then stopped, its rotating movement may cease not instantly but after a delay.

Using the apparatus for fabricating a multi-fiber polarization-maintaining fiber assembly of the third feature of the present invention, the method of fabricating a multi-fiber polarization-maintaining fiber assembly of the first feature of the present invention can favorably be implemented. In particular, as the polarization-maintaining fiber cables are axially rotated and when the stabilization time has been passed, its orientation is checked. As a result, the adjustment of the orientation can be carried out accounting for directional discrepancies of the polarization-maintaining fiber cables caused with a delay due to the viscosity of the thermoset resin after the axial rotation is stopped.

As a fourth feature of the present invention, an apparatus for fabricating a multi-fiber polarization-maintaining fiber assembly is provided in which the clamping jig includes a heating means for heating up the multi-fiber ferrule clamped by the ferrule clamping means, and the orientation adjusting unit includes a heatup controlling means for controllably driving the heating, after the orientation adjustment, to heat and cure the thermoset resins.

Using the apparatus for fabricating a multi-fiber polarization-maintaining fiber assembly of the fourth feature of the present invention, the method of fabricating a multi-fiber polarization-maintaining fiber assembly of the first feature of the present invention can favorably be implemented. In particular, the thermoset resin is automatically heated and cured after the automatic adjustment on the orientation of the polarization-maintaining fiber cables and a duration required for the heating and curing can significantly be shorter than that of the manual operation by the operator.

DETAILED DESCRIPTION OF THE PREFERRED EMBODIMENTS

The present invention will be described in more detail in the form of some preferred embodiments referring to the relevant drawings. It is understood that the present invention is not limited to the embodiments.

Figure 1:
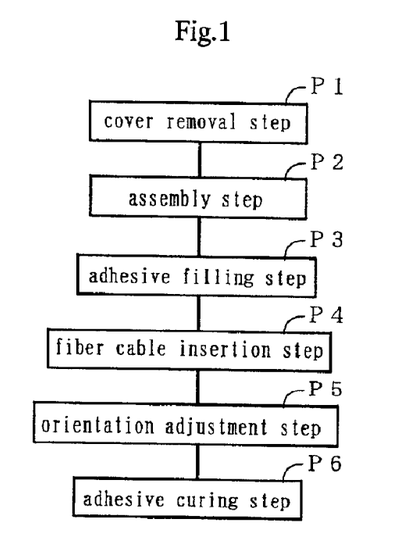
FIG. 1 is a flowchart showing steps of a method of fabricating a two-fiber polarization-maintaining fiber assembly according to one embodiment of the present invention.

FIG. 1 is a flowchart showing a method of fabricating a two-fiber polarization-maintaining fiber assembly of one embodiment of the present invention.

In step P1, a cover removal step is carryied out.

Figure 2:
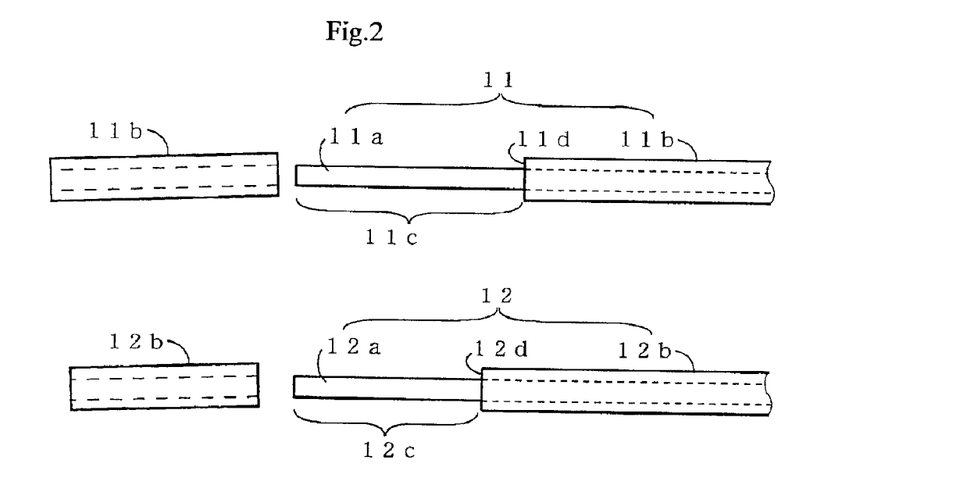
FIG. 2 is a schematic view of polarization-maintaining fiber cables explaining a cover removal step in the embodiment.

As shown in FIG. 2, a cover 11b of, for example, 5 cm long is removed from one end of a first polarization-maintaining fiber cable 11 to expose a first polarization-maintaining fiber 11a. The leading end of the first polarization-maintaining fiber 11a is cut vertically.

Similarly, a cover 12b of, for example, 4.5 cm long is removed from one end of a second polarization-maintaining fiber cable 12 to expose a second polarization-maintaining fiber 12a. The leading end of the second polarization-maintaining fiber 12a is cut vertically.

Accordingly, a difference in the length between the two exposed fiber portions 11c and 12c is, for example, 5 mm.

In step P2, an assembly step is carried out.

Figure 3:
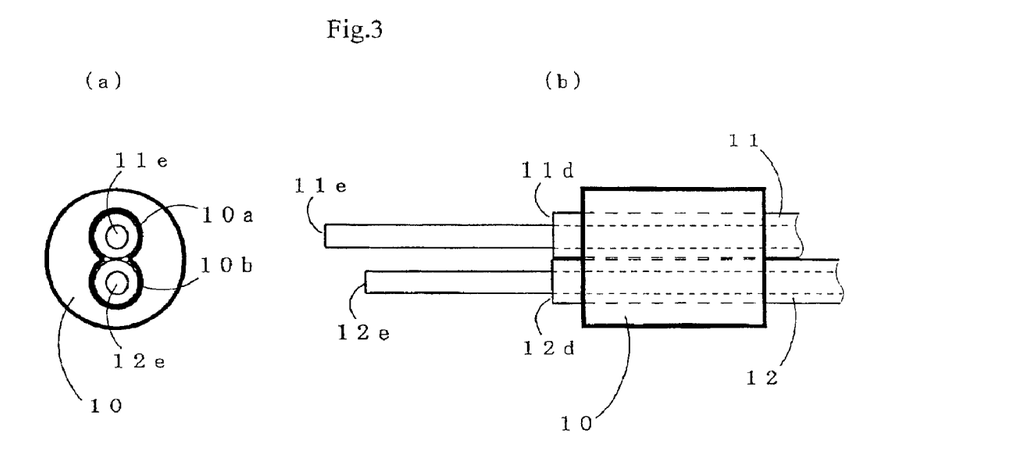
FIG. 3 illustrates an end view and a side view of a holder tube illustrating the first stage of an assembly step in the embodiment.

As shown in FIG. 3, the first polarization-maintaining fiber cable 11 and the second polarization-maintaining fiber cable 12 are inserted and held integrally in insertion holes 10a and 11b of a holder tube 10 made of nylon respectively with their proximal ends 11d and 12d of the exposed fiber portions 11c and 12c arranged abreast. As a result, the leading end 11e of the first polarization-maintaining fiber cable 11 extends 5 mm from the leading end 12e of the second polarization-maintaining fiber cable 12. FIG. 3(a) is a view seen from the leading end and FIG. 3(b) is a view seen from one side.

Figure 4:
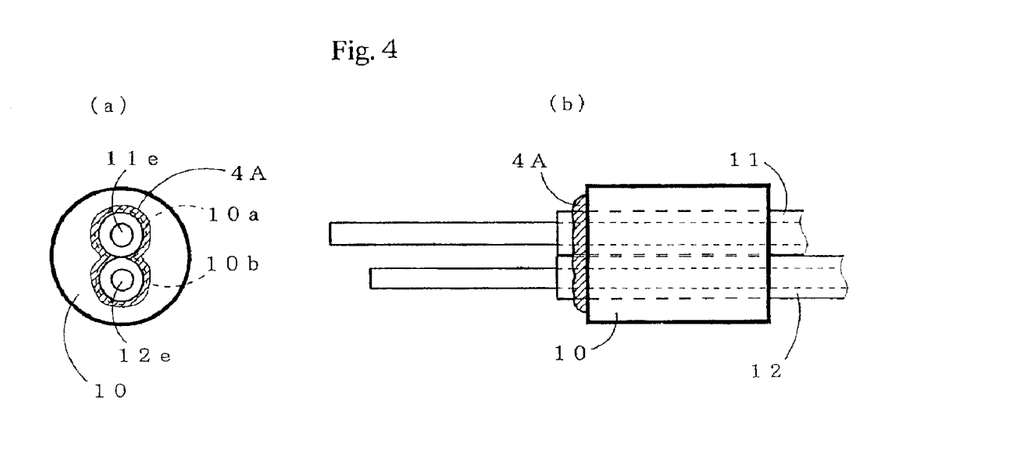
FIG. 4 illustrates an end view and a side view of a holder tube illustrating the second stage of the assembly step in the embodiment.

Then, the two insertion holes 10a and 10b are filled up at the leading end with a thermoset resin 4A which has a relatively high viscosity as shown in FIG. 4. The thermoset resin 4A may be "High-super", a product of Cemedine co., ltd., having a viscosity of 38000 cps. Also, FIG. 4(a) is a view seen from the leading end and FIG. 4(b) is a view seen from one side.

In step P3, an adhesive filling step is carried out.

Figure 5:
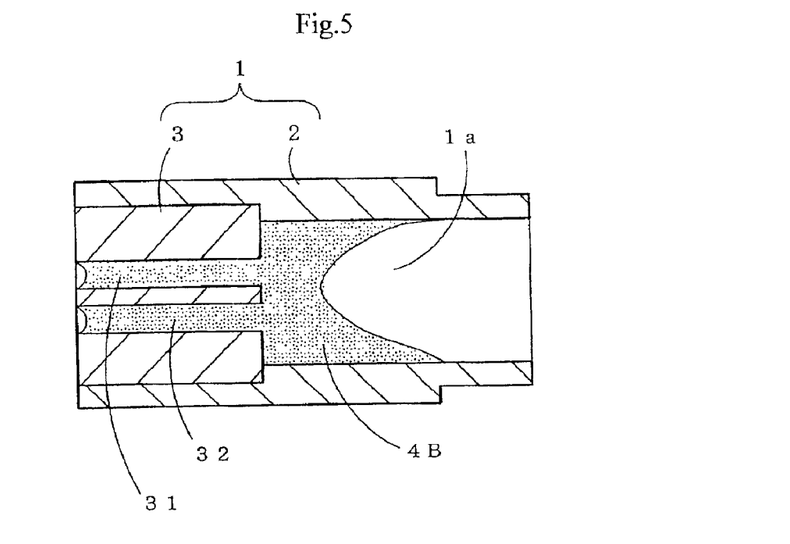
FIG. 5 is a cross sectional view of a two-fiber ferrule explaining an adhesive filling step in the embodiment.

As shown in FIG. 5, a thermoset resin 4B which has a relative low viscosity is injected into the inner space 1a of a two-fiber ferrule 1 which comprises a stainless steel tube 2 and a ceramic block 3 fixedly mounted to the leading end of the stainless steel tube 2. The thermoset resin 4B may be "3BND", a product of Epoxy technology Inc., having a viscosity of 2000 cps. Simultaneously, when a first fiber hole 31 and a second fiber hole 32 are vacuumed by the action of a vacuum pump, they are easily filled up with the thermoset resin 4B.

In step P4, a fiber cable insertion step is carried out.

Figure 6:
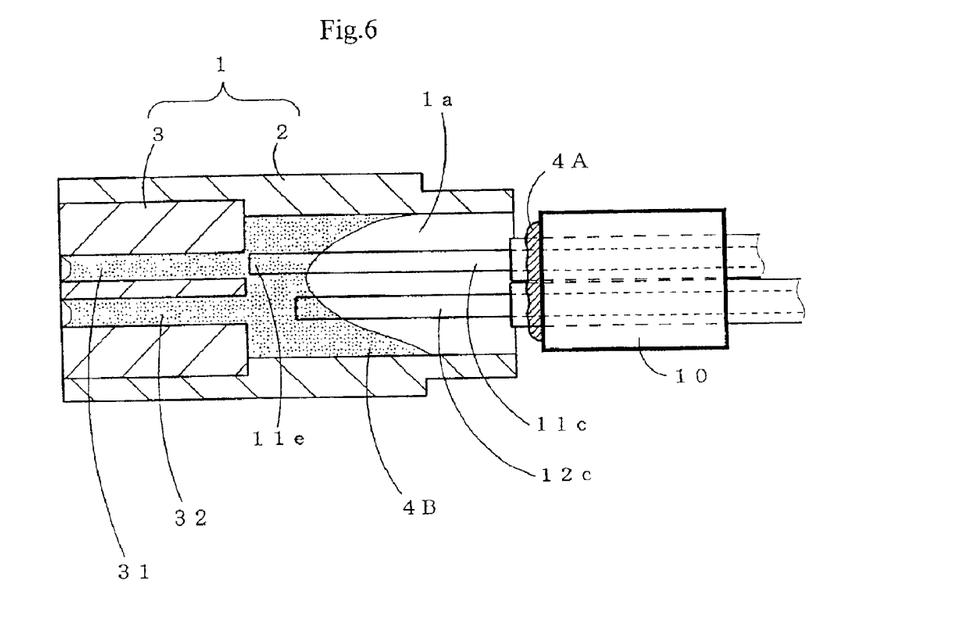
FIG. 6 is a cross sectional view of the two-fiber ferrule explaining the first stage of a fiber cable insertion step in the embodiment.
Figure 7:
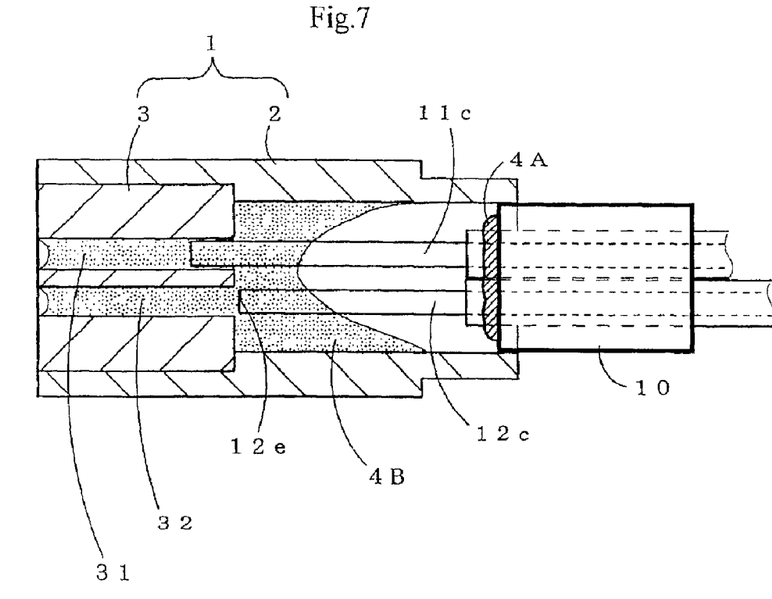
FIG. 7 is a cross sectional view of the two-fiber ferrule explaining the second stage of the fiber cable insertion step in the embodiment.
Figure 8:
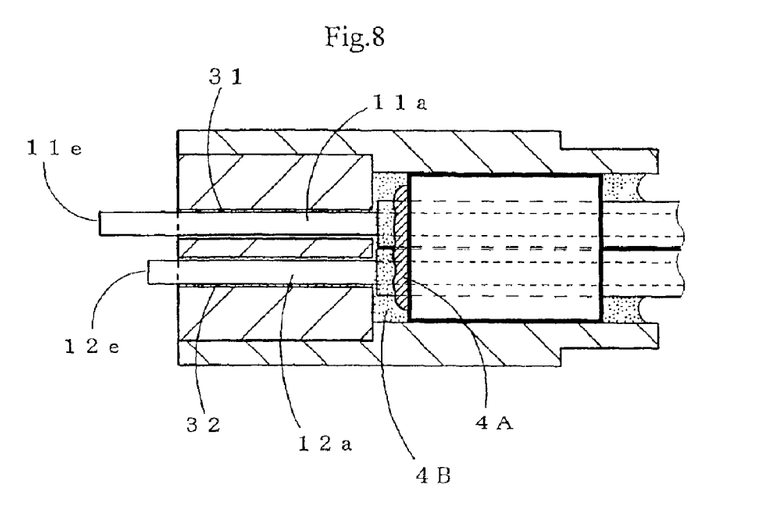
FIG. 8 is across sectional view of the two-fiber ferrule explaining the third stage of the fiber cable insertion step in the embodiment.

As shown in FIG. 6, the two polarization-maintaining fiber cables 11 and 12 assembled by the holder tube 10 are inserted into the inner space 1a of the two-fiber ferrule 1 filled with the second thermoset resin 4B. More particularly, the leading end 11e of the first polarization-maintaining fiber cable 11 is firstly inserted into the first fiber hole 31. Then, the leading end 12e of the second polarization-maintaining fiber cable 12 is inserted into the second fiber hole 32 as shown in FIG. 7. Finally, the two polarization-maintaining fibers 11a and 12a are inserted into the corresponding fiber holes 31 and 32 until the leading ends 11e and 12e extend out, as shown in FIG. 8.

Then, excessive portions of the second thermoset resin 4B are removed off from the leading ends 11e and 12e of the two polarization-maintaining fibers 11a and 12a.

In step P5, an orientation adjustment step is carried out.

Figure 9:
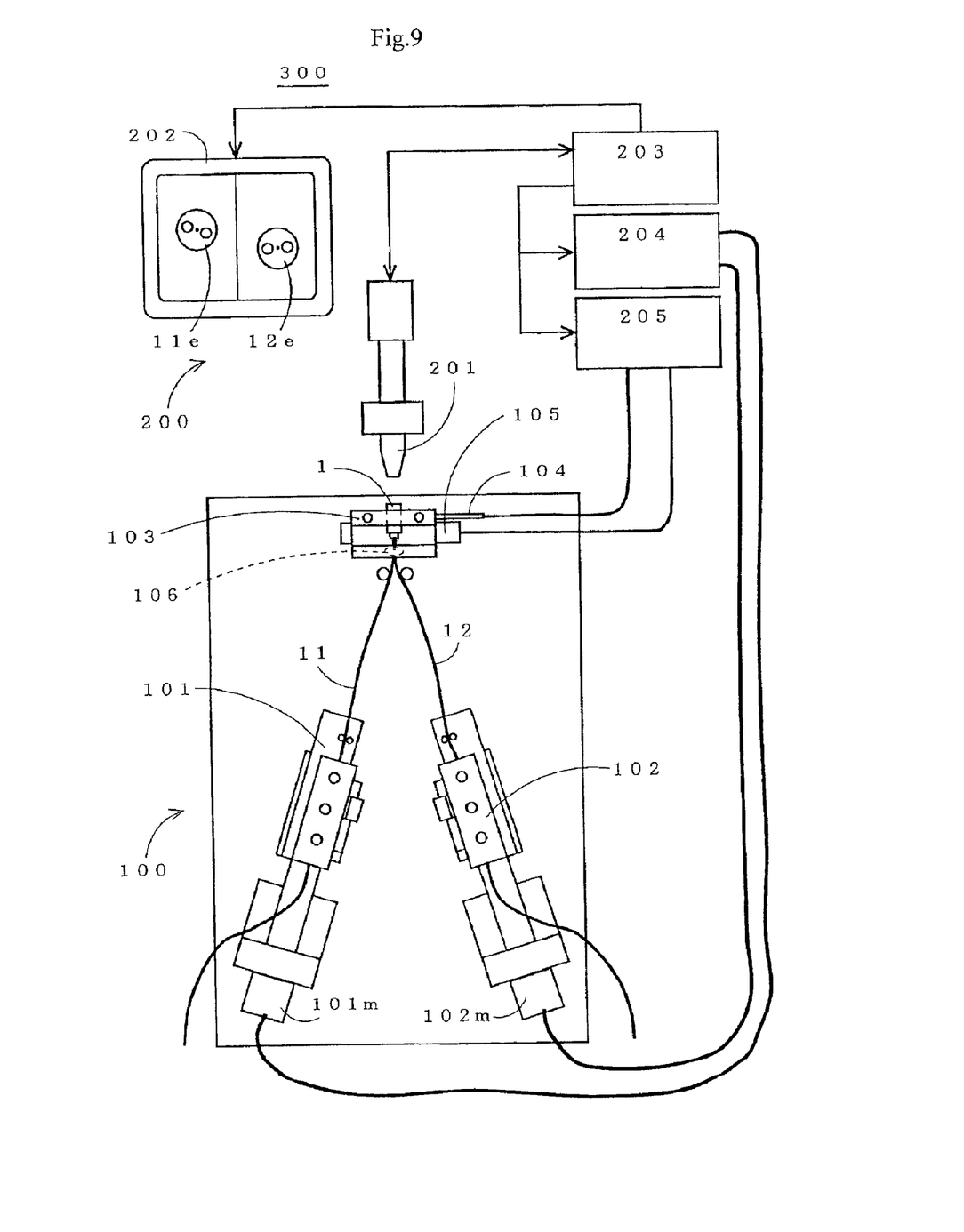
FIG. 9 is a schematic view of an apparatus for fabricating a two-fiber polarization-maintaining fiber assembly according to the present invention.

As shown in FIG. 9, a two-fiber polarization-maintaining fiber assembly fabricating apparatus 300 comprises a clamping jig 100 and an orientation adjusting unit 200.

The clamping jig 100 has a ferrule holder 103 provided for clamping the two-fiber ferrule 1. The two-fiber ferrule 1 is clamped between upper plate and lower plate so as not to be rotated. An illumination light 106 is provided for illuminating the covers 11b and 12b of the polarization-maintaining fiber cables 11 and 12 at a position just before inserted into the two-fiber ferrule 1.

The clamping jig 100 has a couple of fiber cable clamps 101 and 102 provided for clamping the first polarization-maintaining fiber cable 11 and the second polarization-maintaining fiber cable 12 respectively. Each of the two polarization-maintaining fiber cables 11 and 12 is clamped between upper and lower rolls. As the lower rolls are driven by servo motors 101m and 102m, the polarization-maintaining fiber cables 11 and 12 can rotate about their axes respectively.

This is followed by actuating the orientation adjusting unit 200.

Figure 10:
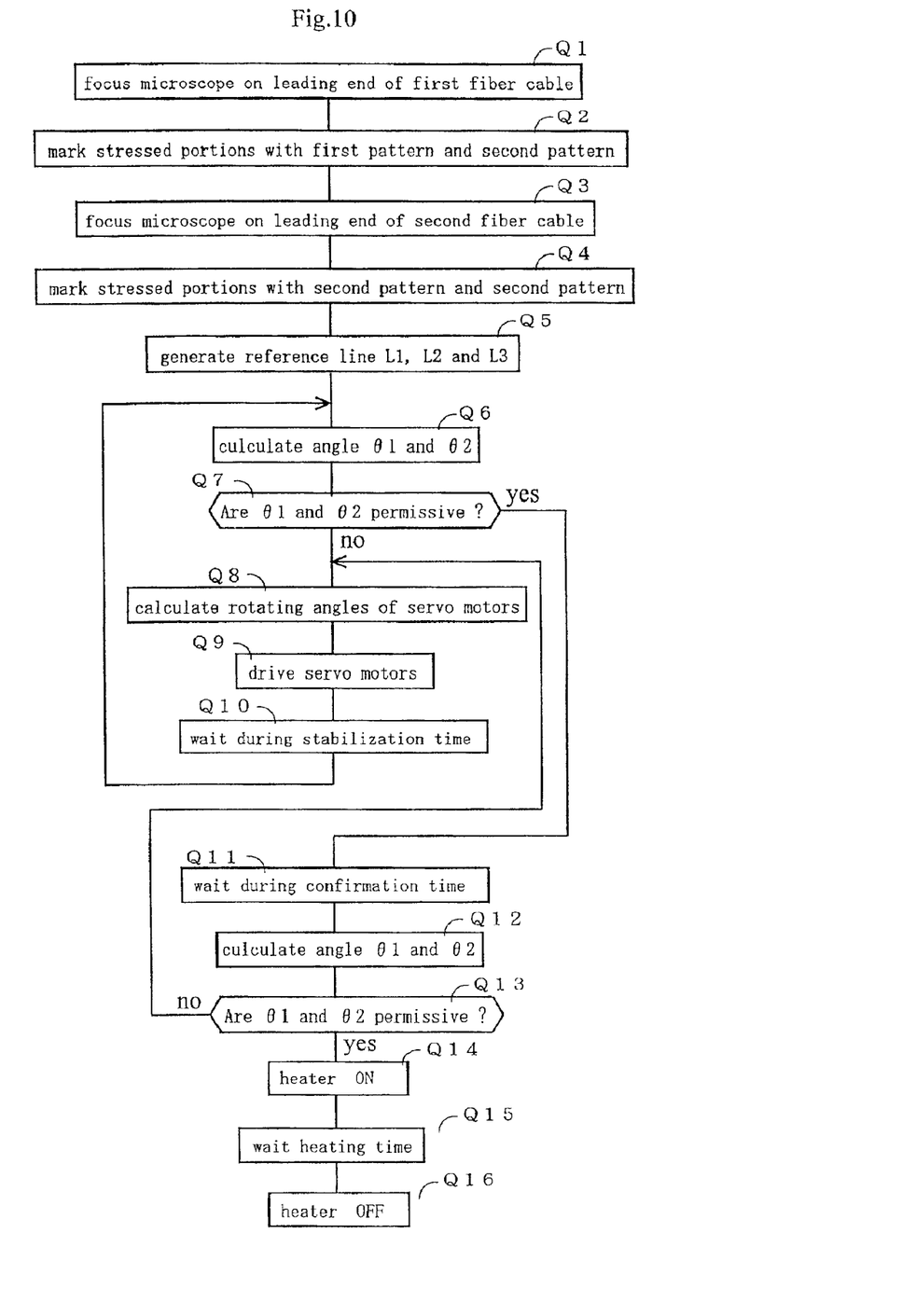
FIG. 10 is a flowchart of the action of the apparatus for fabricating a two-fiber polarization-maintaining fiber assembly according to the present invention.

FIG. 10 is a flowchart showing the action of the orientation adjusting unit 200.

Figure 11:
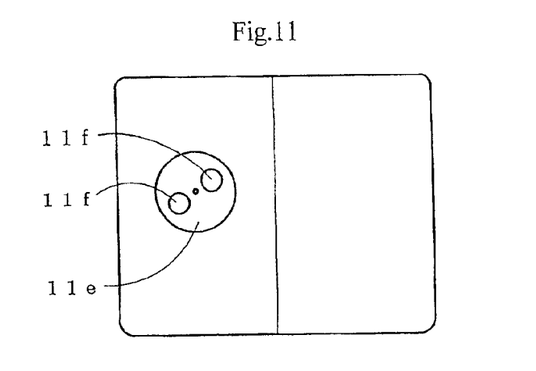
FIG. 11 is a schematic view showing an image of the leading end of a first polarization-maintaining fiber.

The action starts with Step Q1 for driving a processor 203 to focus a microscope 201 on the leading end lie of the first polarization-maintaining fiber cable 11 which projects out from the two-fiber ferrule 1. An image of the leading end lie taken by the microscope 201 is displayed on one half of the screen of a display 202 as shown in FIG. 11.

Figure 12:
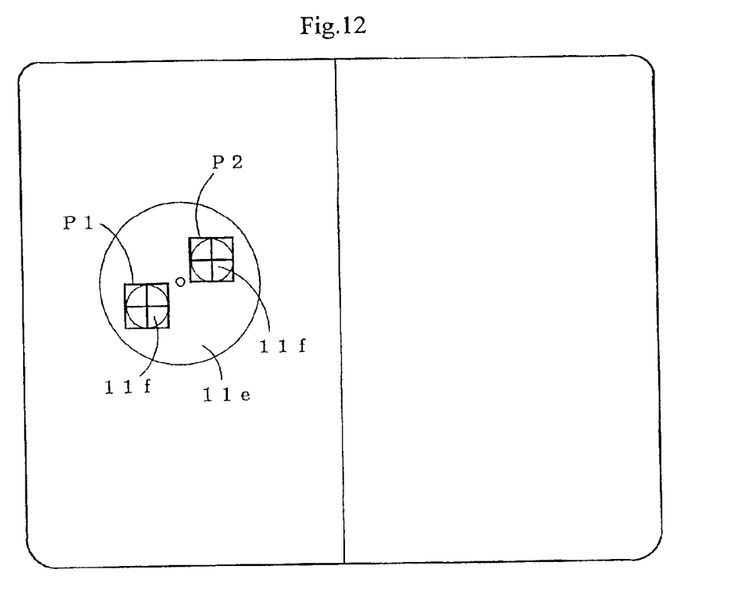
FIG. 12 is an explanatory view showing an image of stressed portions at the leading end of the first polarization-maintaining fiber.

Step Q2 follows where the image is analyzed by the processor 203 to identify stressed portions 11f, 11f of the leading end 11e of the first polarization-maintaining fiber cable 11. The two stressed portions 11f, 11f are marked with a first pattern P1 and a second pattern P2 respectively of a square shape as shown in FIG. 12.

Figure 13:
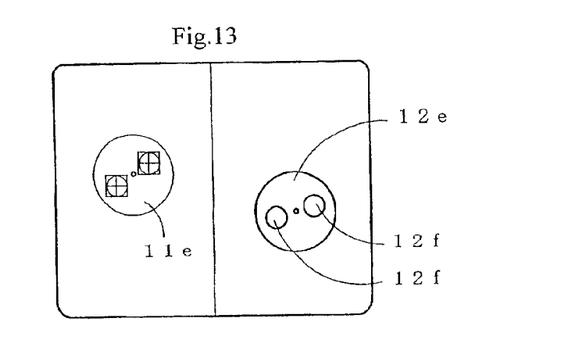
FIG. 13 is a schematic view showing an image of the leading end of a second polarization-maintaining fiber.

In Step Q3, the processor 203 drives the microscope 201 to focus on the leading end 12e of the second polarization-maintaining fiber cable 12 which projects out from the two-fiber ferrule 1. The image of the leading end 12e of the second polarization-maintaining fiber cable 12 taken by the microscope 201 is displayed on the other half of the screen of the display 202 as shown in FIG. 13.

Figure 14:
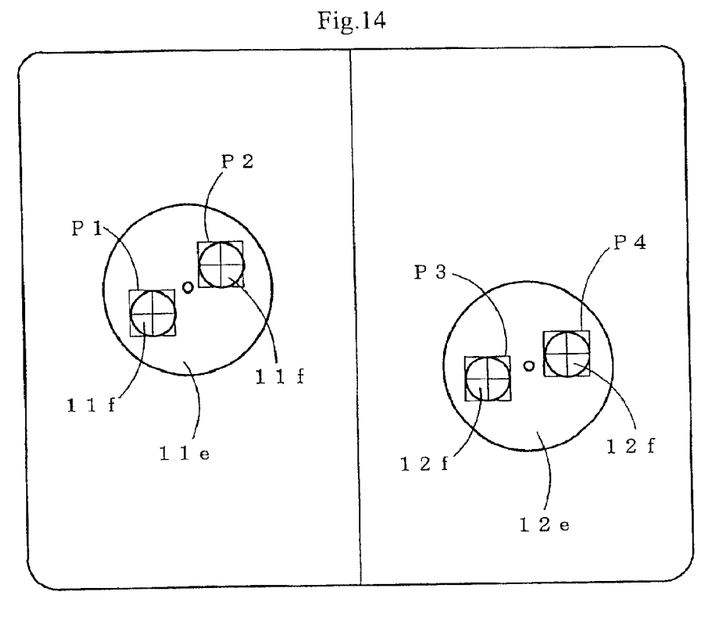
FIG. 14 is an explanatory view showing an image of stressed portions at the leading end of the second polarization-maintaining fiber.

In Step Q4, the processor 203 analyzes the image to identify stressed portions 12f, 12f of the leading end 12e of the second polarization-maintaining fiber cable 12. The stressed portions 12f, 12f are marked with a third pattern P3 and a fourth pattern P4 of a square shape as shown in FIG. 14.

Figure 15:
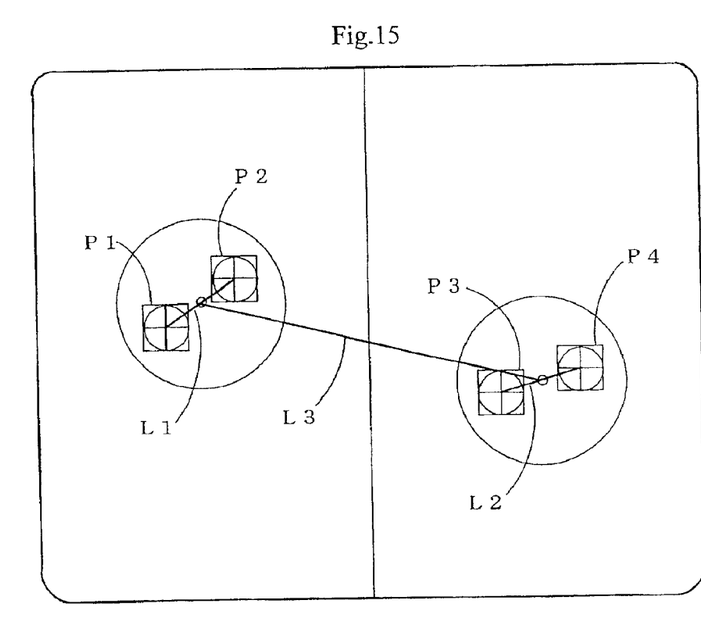
FIG. 15 is an explanatory view showing the determination of a reference line for orientation adjustment of the polarization-maintaining fiber cables.

In Step Q5, the processor 203 determines a first reference line L1 extending between the center of the first pattern P1 and the center of the second pattern P2 as shown in FIG. 15. Also, a second reference line L2 extending between the center of the third pattern P3 and the center of the fourth pattern P4 is determined. Moreover, a third reference line L3 extending between the center of the first reference line L1 and the center of the second reference line L2 is determined.

Figure 16:
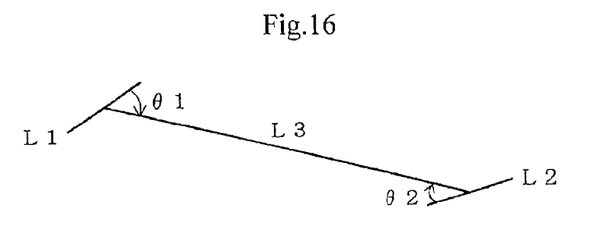
FIG. 16 is an explanatory view showing an angle between the two reference lines for orientation adjustment of the polarization-maintaining fiber cables.

In Step Q6, the processor 203 calculates a first angle $\theta 1$ of the third reference line L3 turned clockwisely from the first reference line L1 and a second angle $\theta 2$ of the third reference line L3 turned clockwisely from the second reference line L2 as shown in FIG. 16.

In Step Q7, the processor 203 examines whether or not a first angle difference ($\theta1-\psi1$) between the first angle $\theta1$ and a first target angle $\theta1$ predetermined by an operator stays within a permissive range. Also, it is examined whether or not a second angle difference ($\theta2-\psi2$) between the second angle $\theta2$ and a second target angle $\omega2$ predetermined by the operator stays within the permissive range. When both the first and second angle differences ($\theta1-\psi1$) and ($\theta2-\psi2$) are within the range, the procedure jumps to Step Q11. If not, the procedure goes to Step Q8.

In Step Q8, the processor 203 calculates the rotating angles $\phi1$ and $\phi2$ of the two servo motors 101m and 102m so that both the first angle difference ($\theta1-\psi1$) and the second angle difference ($\theta2-\psi2$) stay in the range.

In Step Q9, the processor 203 drives the servo motors 101m and 102m via a motor controller 204 to rotate through the angles $\phi1$ and $\phi2$ respectively.

In Step Q10, the processor 203 stands by until a specific length of time (e.g. six seconds) for stabilization passes and its procedure returns back to Step Q6. This stabilization time allows the polarization-maintaining fiber cables 11 and 12 to be subjected to the angular adjustment considering angular errors due to the viscosity of the thermoset resin after the action of the servo motors 101m and 102m is stopped. The angular errors can quickly be corrected to stay within the permissive range, as compared with the adjustment without the stabilization time.

Figure 17:
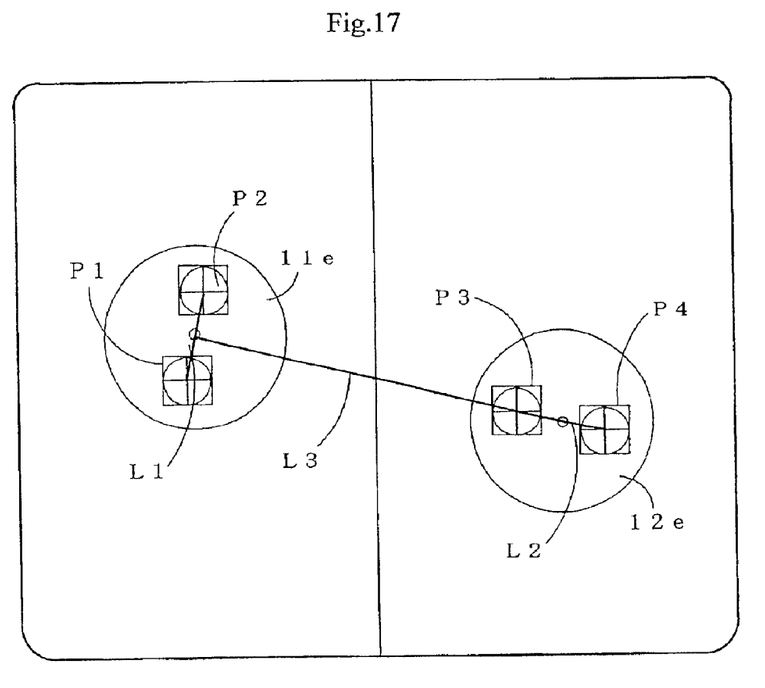
FIG. 17 is a schematic view showing an image of the polarization-maintaining fiber cables after the orientation adjustment.

Assuming that the first target angle $\psi1$ is 90 degrees and the second target angle $\psi2$ is zero degree, the leading ends 11e and 12e of the polarization-maintaining fiber cables 11 and 12 can be orientated as shown in FIG. 17.

In Step Q11, the processor 203 stands by until a specific length of time (e.g. thirty seconds) for confirmation passes before its procedure goes to Step Q12. Because of the conformation time, it can be judged that both the first angle difference ($\theta1-\psi1$) and the second angle difference ($\theta2-\psi2$) stay in the permissive range even if the procedure skips Steps Q8 to Q10 as the first angle difference ($\theta1-\psi1$) and the second angle difference ($\theta2-\psi2$) accidentally fall in the permissive range.

In Step Q12, the processor 203 calculates the first angle $\theta1$ and the second angle $\theta2$.

In Step Q13, the procedure of the processor 203 advances to Step Q14 when both the first angle difference ($\theta1-\psi1$) and the second angle difference ($\theta2-\psi2$) stay in the permissive range and if not, returns back to Step S8.

In Steps Q14 to Q16, the processor 203 drives a heater controller 205 to energize a heater 105 while monitoring a temperature sensor 104 for heating and curing the thermoset resins 4A and 4B and then switches the heater 105 off.

The heater 105 may be operated in a range of conditions from at 60° C. to at 80° C. and from for one hour to for two hours. When the heating is lower than 60° C. and shorter than one hour, the curing effect will be declined. When the heating is higher than 80° C. and longer than two hours, the fiber cables 11 and 12 may be affected in the properties.

After Step Q16, the two-fiber ferrule 1 with the two polarization-maintaining fiber cables 11 and 12 are removed from the clamping jig 100 and the leading end of the two-fiber ferrule 1 is polished.

Figure 18:
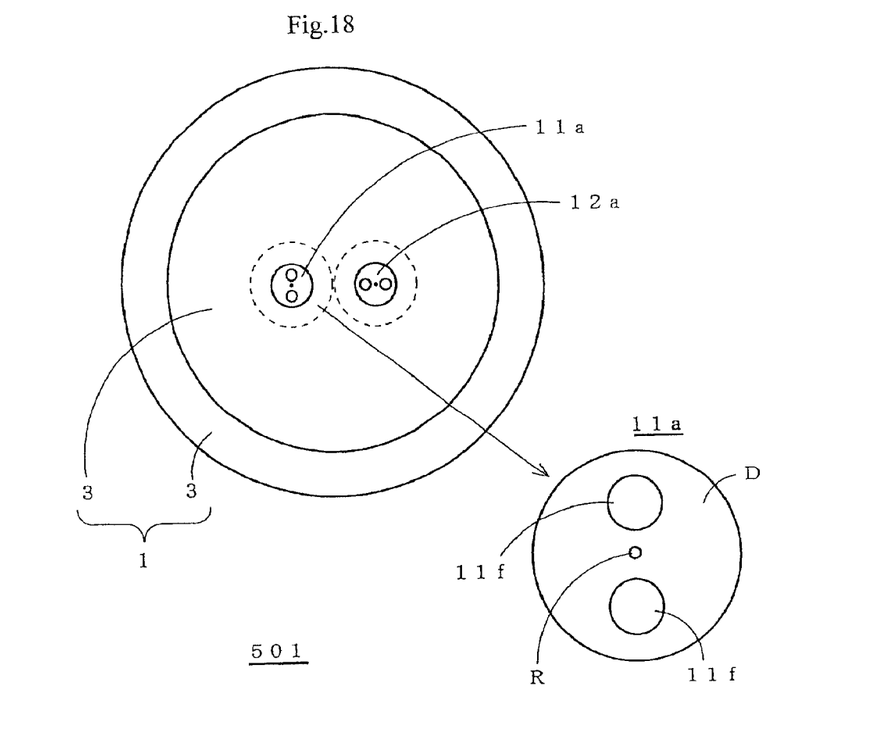
FIG. 18 is a schematic view showing the leading end of a first example of a symmetrical two-fiber polarization-maintaining fiber assembly fabricated by the method of the present invention.

FIG. 18 is a schematic view showing the leading end of a symmetrical two-fiber polarization-maintaining fiber assembly 501 fabricated at $\psi1=90°$ and $\psi2=0°$.

Figure 19:
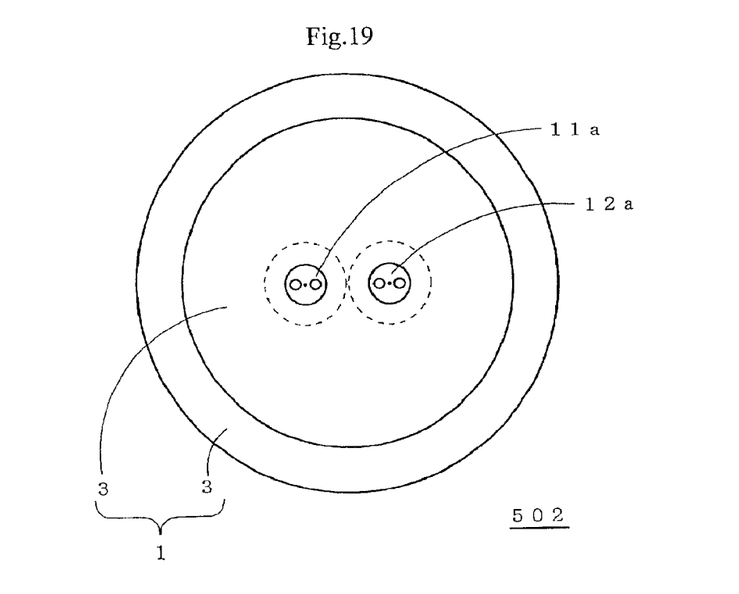
FIG. 19 is a schematic view showing the leading end of a second example of the symmetrical two-fiber polarization-maintaining fiber assembly fabricated by the method of the present invention.

FIG. 19 is a schematic view showing the leading end of a symmetrical two-fiber polarization-maintaining fiber assembly 502 fabricated at $\psi1=0°$ and $\psi2=0°$.

Figure 20:
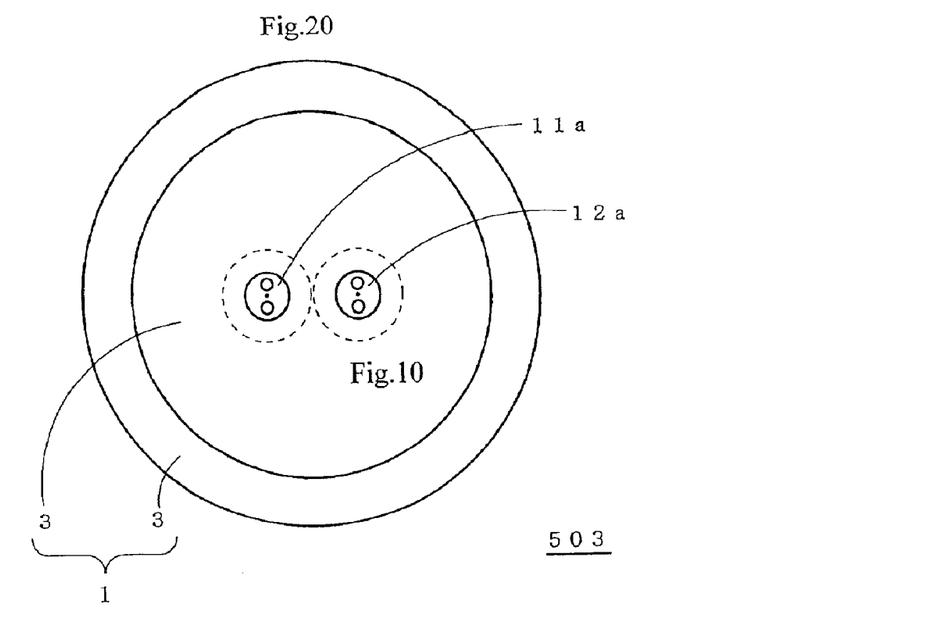
FIG. 20 is a schematic view showing the leading end of a third example of the symmetrical two-fiber polarization-maintaining fiber assembly fabricated by the method of the present invention.

FIG. 20 is a schematic view showing the leading end of a symmetrical two-fiber polarization-maintaining fiber assembly 503 fabricated at $\psi1=90°$ and $\psi2=90°$.

Figure 21:
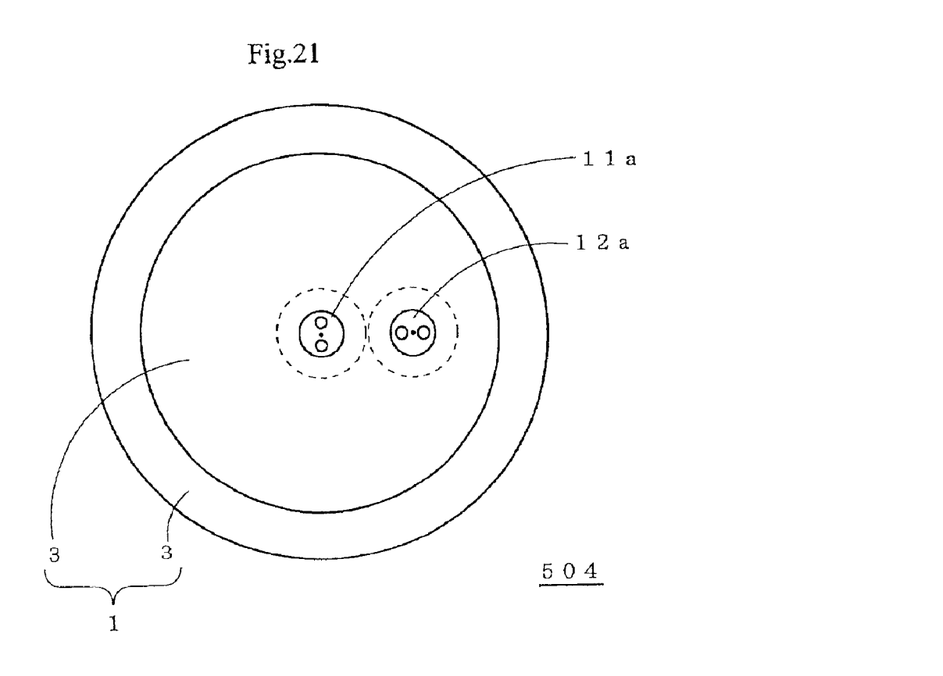
FIG. 21 is a schematic view showing the leading end of a first example of an asymmetrical two-fiber polarization-maintaining fiber assembly fabricated by the method of the present invention.

FIG. 21 is a schematic view showing the leading end of an asymmetrical two-fiber polarization-maintaining fiber assembly 504 fabricated at $\psi1=90°$ and $\psi2=0°$.

Figure 22:
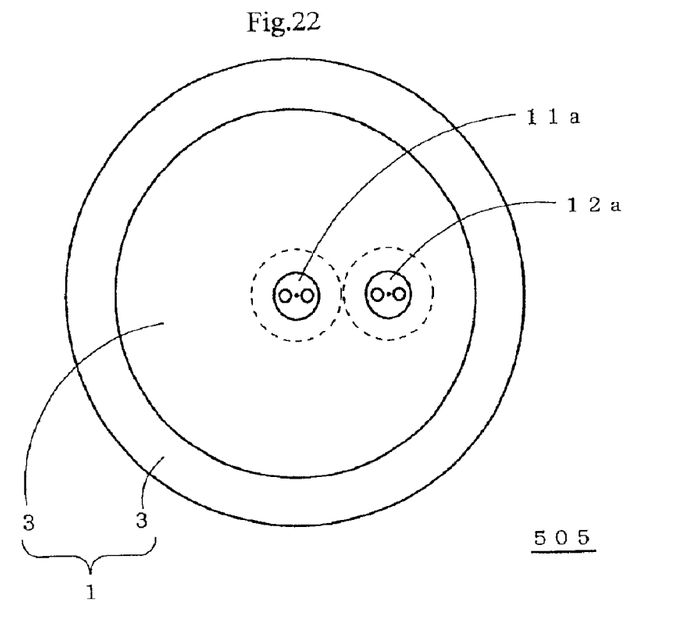
FIG. 22 is a schematic view showing the leading end of a second example of the asymmetrical two-fiber polarization-maintaining fiber assembly fabricated by the method of the present invention.

FIG. 22 is a schematic view showing the leading end of an asymmetrical two-fiber polarization-maintaining fiber assembly 505 fabricated at $\psi1=0°$ and $\psi2=0°$.

Figure 23:
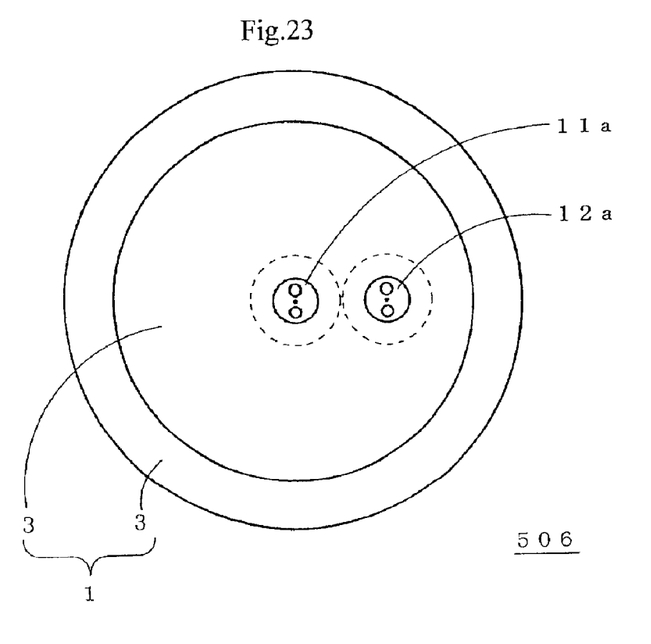
FIG. 23 is a schematic view showing the leading end of a third example of the asymmetrical two-fiber polarization-maintaining fiber assembly fabricated by the method of the present invention.

FIG. 23 is a schematic view showing the leading end of an asymmetrical two-fiber polarization-maintaining fiber assembly 506 fabricated at $\psi1=90°$ and $\psi2=90°$.

Figure 24:
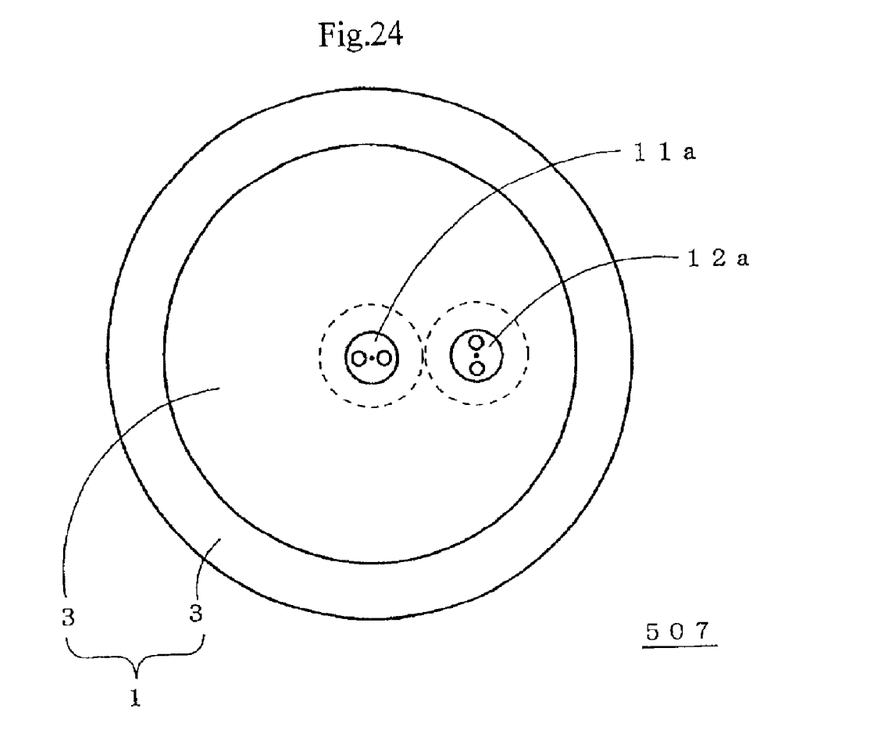
FIG. 24 is a schematic view showing the leading end of a fourth example of the asymmetrical two-fiber polarization-maintaining fiber assembly fabricated by the method of the present invention.

FIG. 24 is a schematic view showing the leading end of an asymmetrical two-fiber polarization-maintaining fiber assembly 507 fabricated at $\psi1=0°$ and $\psi2=90°$.

While the present invention is described in the form of a method and an apparatus for fabricating the two-fiber polarization-maintaining fiber assembly, it may equally be applied to a method and an apparatus for fabricating a three or more fibers polarization-maintaining fiber assembly.

The above embodiments are based on but not limited to panda-type polarization-maintaining fibers and may employ other types of the polarization-maintaining fiber with equal success.

The advantages of the method and the apparatus for fabricating a multi-fiber polarization-maintaining fiber assembly has following advantages.

(1) The process for inserting the polarization-maintaining fibers into the inner space of the multi-fiber ferrule is eased.

(2) The process for inserting the polarization-maintaining fibers into the corresponding fiber holes of the multi-fiber ferrule is eased.

(3) The relatively low viscosity thermoset resin hardly disturbs the insertion of the polarization-maintaining fibers into the corresponding fiber holes.

(4) The relatively low viscosity thermoset resin filled in the inner space of the multi-fiber ferrule is inhibited from being absorbed into the insertion hole of the holder tube by sealing the leading end of the insertion hole with the relatively high viscosity thermoset resin.

(5) The clamping jig is used for adjusting the orientation of each polarization-maintaining filer cable, thus contributing to the ease of the operation.

(6) The thermoset resin is heated in condition with the multi-fiber ferrule secured by the clamping jig, thus easing the operation.

Particularly, the advantage of the apparatus for fabricating a multi-fiber polarization-maintaining fiber assembly according to the present invention has following advantages.

(7) The orientation of each polarization-maintaining fiber cable is automatically controlled and a duration required for its action can significantly be shorter than that of the manual operation by an operator.

(8) The adjustment of the orientation is carried out accounting for directional discrepancies of the polarization-maintaining fiber cables caused with a delay after the action of driving the axial rotation is stopped.

(9) The thermoset resin is automatically heated and cured after the automatic adjustment on the orientation of the polarization-maintaining fiber cables and a duration required for the heating and curing can significantly be shorter than that of the manual operation by the operator.

What is claimed is:

1. A method of fabricating a multi-fiber polarization-maintaining fiber assembly, comprising:

(1) a cover removal step for removing covers a few centimeters at one end from a plurality of polarization-maintaining fiber cables with a difference of a few millimeters therebetween to form exposed fiber portions of different lengths from one another;

(2) an assembly step for inserting the polarization-maintaining fiber cables into an insertion hole of a holder tube, holding said polarization-maintaining fiber cables integrally with said exposed fiber portions thereof arranged abreast at a proximal end such that a leading end of a one of the polarization-maintaining fiber cables having a one of the exposed fiber portions which is greater in length than an other of said polarization-maintaining fiber cables extends forward of a corresponding leading end of said other of said polarization-maintaining fiber cables, and sealing the insertion holes of the holder tube with a thermoset resin which is relatively high in viscosity;

(3) an adhesive filling step for filling an inner space of a multi-fiber ferrule with a thermoset resin which is relatively low in viscosity;

(4) fiber cable insertion step for inserting the polarization-maintaining fiber cables assembled integral with the holder tube into the inner space of the multi-fiber ferrule, and inserting exposed fiber portions thereof into corresponding fiber holes of the multi-fiber ferrule;

(5) an orientation adjustment step for, while clamping the multi-fiber ferrule with a clamping jig so as not to be turned, rotating each of the polarization-maintaining fiber cables to determine orientation thereof; and (6) an adhesive curing step for heating the multi-fiber ferrule while remaining clamped by the clamping jig to cure the thermoset resins.

2. A method of fabricating a multi-fiber polarization-maintaining fiber assembly, comprising the steps of:

removing respective length portions of covers from at least two polarization-maintaining fiber cables, each of said respective length portions being removed from an end of each of the at least two polarization-maintaining fiber cables, said respective length portions differing in length from one another such that exposed fiber portions of the at least two polarization-maintaining fiber cables are formed with different lengths, said respective length portions of said covers being a few centimeters, and said respective length portions differing in length by a few millimeters;

arranging and holding the polarization-maintaining fiber cables with said exposed fiber portions running codirectionally and laterally disposed adjacent one another positioned such that a leading end of a one of said at least two polarization-maintaining fiber cables having a longer of said different lengths than an other of said at least two polarization-maintaining fiber cables extends forward of a corresponding leading end of said other of said at least two polarization-maintaining fiber cables; and inserting the polarization-maintaining fiber cables into an inner space of a multi-fiber ferrule and the exposed fiber portions thereof into corresponding fiber holes of the multi-fiber ferrule.

* * * * *